(No Model.)
T. G. SPRINGER.
PROCESS OF AND APPARATUS FOR SUPPLYING AND MEASURING A HEATING AND AN ILLUMINATING GAS FROM ONE MAIN.
No. 264,359.  Patented Sept. 12, 1882.
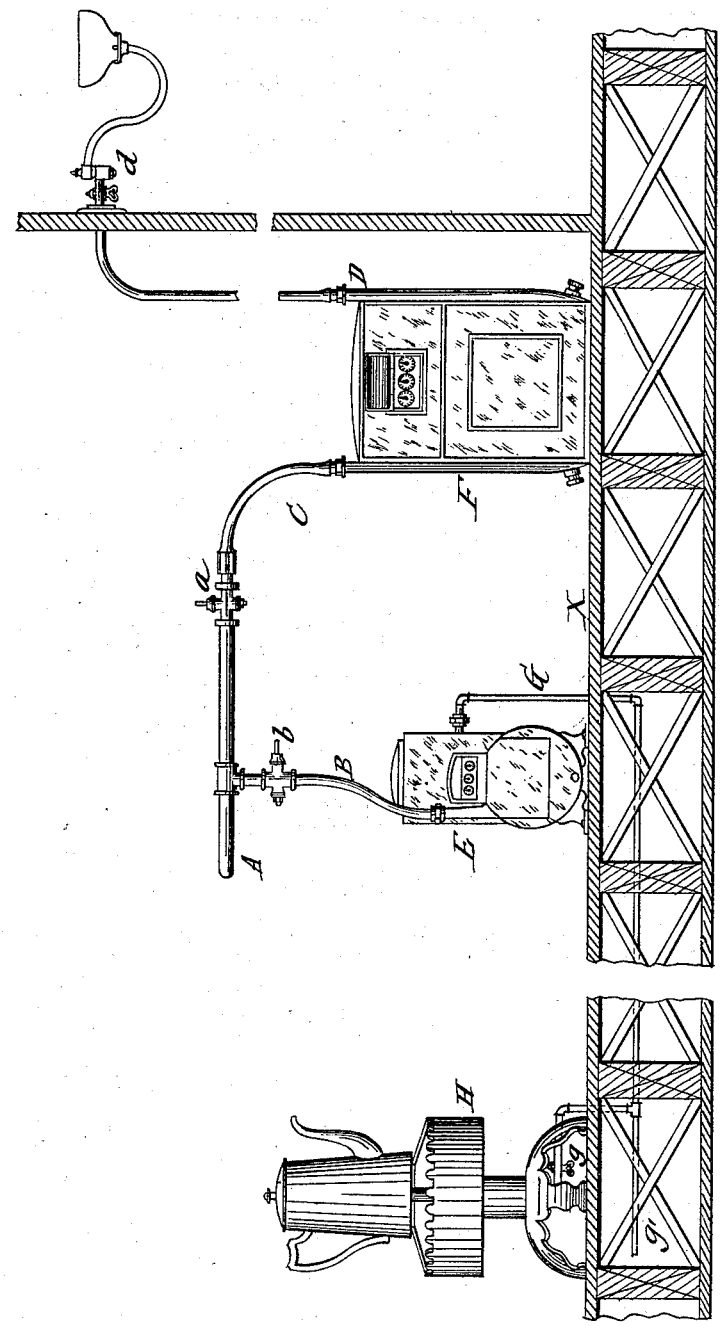
Witnesses:
Chas. E. Gaylord.
C. J. Williamson.
Inventor:
Theodore G. Springer
O. E. Duffy
Attys.

UNITED STATES PATENT OFFICE.

THEODORE G. SPRINGER, OF NEW YORK, N. Y.

PROCESS OF AND APPARATUS FOR SUPPLYING AND MEASURING A HEATING AND AN ILLUMINATING GAS FROM ONE MAIN.

SPECIFICATION forming part of Letters Patent No. 264,359, dated September 12, 1882.

Application filed August 14, 1882. (No model.)

*To all whom it may concern:*

Be it known that I, THEODORE G. SPRINGER, of the city, county, and State of New York, have invented an Improvement in the Process of and Apparatus for Supplying and Measuring a Heating and an Illuminating Gas from one Main; and I do hereby declare the following to be a full, clear, and exact description thereof, reference being had to the accompanying drawing.

This invention relates to a method of and apparatus for supplying and measuring a heating-gas and an illuminating-gas from one source of supply or from one main at the same time, if desired, or each independently, as required.

The object of the invention is to obviate the expense of a double set of mains, one for illuminating-gas and one for heating-gas, where a supply of each is required, and at the same time supply a good illuminating-gas through an appropriate meter to the burners for illuminating purposes, and also to supply from the same main a suitable heating-gas at a reduced expense through a gas-and-air-mixing meter to the burners in gas stoves or ranges. The growing demand for a heating-gas for domestic purposes—such as cooking and heating and warming—makes it desirable to supply such gas to the consumer at a comparatively cheap rate through the system of mains now laid, and which at the same time supply the illuminating-gas. This can readily be accomplished by means of my process and apparatus. While illuminating-gas should yield a white flame, the heating-gas may be burned still more effectively, yielding a greater volume of heat for the gas consumed, and with more perfect combustion with a dark or bluish flame. Now, in order to supply the heating-gas in large quantities and at lower rates, and at the same time guard against the use of gas at the said lower rate for illuminating purposes, I provide that the gas for heating purposes drawn from the illuminating-gas main shall be mixed with a regulated quantity of air by a gas-and-air-mixing meter on the way to the burners, which will render it non-illuminating, but will adapt it for more complete and perfect combustion, whereby its full heating or calorific value is obtained and utilized. By thus cheapening and popularizing gas for heating purposes and guarding against the fraudulent use at the lower rate of the gas for illuminating purposes a gas-company, with its plant and system of mains established and its necessary laboring force on hand may keep its works more uniformly in operation to their full capacity and its laboring force more uniformly and profitably employed by reason of the increased consumption of gas drawn from the mains already laid.

In carrying out my invention I employ a meter for illuminating-gas, connected with the service main and burners, and a gas-and-air-mixing meter connected to the same service-main and to the heating or cooking stove, the connecting-pipes being provided with suitable cocks or valves.

In constructing a gas-and-air-mixing meter, the ordinary wet-meter wheel is divided by a transverse plate or disk into two chambers, suitably proportioned one to the other, each for taking in, measuring, and passing out a suitable volume of gas and air in the proper proportions to form a good mixture for heating purposes. The gas-pipe enters one end of the meter at the axis, discharging within the drum or wheel, while an air-pipe enters the other end of the meter on the opposite side of the dividing-disk, and as the meter-wheel is revolved by the pressure of gas the air is drawn in and the two escape at the periphery of the wheel and mingle in the outer casing thereof, or in separate chambers rising above the casing of the wheel, and thence pass into the eduction-pipe leading to the burners.

The gas and air measuring chambers may be mounted separately on the same axis, with a mixing-chamber between them, and a spring or clock mechanism as a motor may be applied to the casing for driving the meter-wheel.

The mixture of gas and air may be composed of from one to four or five volumes of air to one of ordinary carbureted hydrogen or hydrocarbon gas. These proportions of gas and air can be thus mixed and passed to the burner with perfect safety. A still smaller proportion of air than the above mentioned to the volume of gas passed to the burners may be used and mixed therewith in the meter with perfect safety. For instance, the mixture may be composed of one-fourth air and three-fourths gas, or one-third air and two-thirds gas.

The accompanying drawing represents a view of the devices used in elevation.

The gas-main or service-pipe A, supplying only illuminating-gas, is connected to the usual house-meter, F, by a pipe, C, and a pipe, D, is connected on the other side thereof, and has a key or valve, d, and supplies gas to the illuminating-burners. The flow of gas to the meter F is controlled by valve a. The air-and-gas-mixing meter E, for measuring and supplying heating-gas, is connected to the main A by pipe B, having a controlling-valve, b. This meter is constructed to pass through it a suitably-proportioned quantity of gas and air, so that the mixture shall be best suited for heating purposes, burning with a dark flame unsuitable for illuminating purposes. This mixture of gas and air is conducted to the cooking-stove H by pipe G its flow to the burner being controlled by a valve g. The whole apparatus is supported on the floor X.

The extension of pipe G lettered g may be connected to other heating or cooking stoves.

Both illuminating and heating gas may be supplied and measured at the same time by simply opening the valves in the pipes connected with each meter.

Having described my invention, what I claim, and desire to secure by Letters Patent, is—

1. The process of supplying and measuring a suitable illuminating-gas and a comparatively low-priced heating-gas from one main, which consists in passing the illuminating-gas from the service-pipe to the burners through the usual meter, and passing gas from the same service-pipe to the heating-burners through a gas-and-air-mixing meter, and thereby mixing with it a suitable proportion of air, whereby the calorific value of the gas is increased, and it is caused to burn with a dark flame, and whereby an improved heating-gas may be furnished to the consumer at a comparatively low rate per thousand feet, and a separate record kept of the gas used for each purpose.

2. The combination, with an illuminating-gas main, of a meter for measuring and supplying illuminating-gas, and a gas-and-air-mixing meter for measuring and supplying heating-gas, suitable means for burning each kind of gas, and suitable valves in the connecting-pipes, for the purpose described.

THEO. G. SPRINGER.

Witnesses:
CHAS. L. COOMBS,
EMMA M. GILLETT.